(12) United States Patent
Tanazawa (10) Patent No.: US 9,354,409 B2
(45) Date of Patent: *May 31, 2016

(54) OPTICAL RECEPTACLE AND OPTICAL MODULE

(71) Applicant: Enplas Corporation, Saitama (JP)

(72) Inventor: Masahiro Tanazawa, Saitama (JP)

(73) Assignee: Enplas Corporation, Saitama (JP)

( * ) Notice: Subject to any disclaimer, the term of this patent is extended or adjusted under 35 U.S.C. 154(b) by 10 days.

This patent is subject to a terminal disclaimer.

(21) Appl. No.: 14/324,263

(22) Filed: Jul. 7, 2014

(65) Prior Publication Data

US 2015/0010272 A1 Jan. 8, 2015

(30) Foreign Application Priority Data

Jul. 8, 2013 (JP) ................................. 2013-142605

(51) Int. Cl.
*G02B 6/26* (2006.01)
*G02B 6/42* (2006.01)
*G02B 6/28* (2006.01)

(52) U.S. Cl.
CPC ............ *G02B 6/4286* (2013.01); *G02B 6/4214* (2013.01); *G02B 6/2817* (2013.01)

(58) Field of Classification Search
CPC .................................................. G02B 6/4214
See application file for complete search history.

(56) References Cited

U.S. PATENT DOCUMENTS

| 2002/0110171 A1 | 8/2002 | Wickstrom et al. |
| 2008/0142815 A1 | 6/2008 | Morioka |
| 2015/0030285 A1* | 1/2015 | Tanazawa ............ G02B 6/4214 385/31 |

FOREIGN PATENT DOCUMENTS

| JP | 2000-340877 A | 12/2000 |
| JP | 2004-221420 A | 8/2004 |
| JP | 2008-151894 A | 7/2008 |
| WO | WO 2011077723 A1 * | 6/2011 ........... G02B 6/4214 |

* cited by examiner

*Primary Examiner* — Uyen Chau N Le
*Assistant Examiner* — Chad Smith
(74) *Attorney, Agent, or Firm* — Brundidge & Stanger, P.C.

(57) ABSTRACT

An optical receptacle has a first optical surface which receives incidence of light from a light emitting element, a reflecting surface which reflects the light along a substrate, a light separating section which separates light reflected at the reflecting surface into monitor light and signal light, a second optical surface which emits the monitor light toward a light receiving element, and a third optical surface which emits the signal light toward an optical fiber. The light separating section has a plurality of splitting transmissive surfaces which are vertical surfaces with respect to the optical axis of the light reflected at the reflecting surface and a plurality of splitting reflecting surfaces which are inclining surfaces with respect to the optical axis of the light reflected at the reflecting surface. The splitting transmissive surfaces and the splitting reflecting surfaces are alternately disposed in a first direction and in a second direction.

9 Claims, 11 Drawing Sheets

FIG. 11C ized and claims the benefit of Japa-
OPTICAL RECEPTACLE AND OPTICAL MODULE

CROSS REFERENCE TO RELATED APPLICATIONS

This application is entitled and claims the benefit of Japanese Patent Application No. 2013-142605, filed on Jul. 8, 2013, the disclosure of which including the specification, drawings and abstract is incorporated herein by reference in its entirety.

TECHNICAL FIELD

The present invention relates to an optical receptacle and an optical module having the optical receptacle.

BACKGROUND ART

Optical modules equipped with light emitting elements such as surface emitting lasers (for example, Vertical Cavity Surface Emitting Laser; VCSEL) have been used in fiber-based optical communication. An optical module has an optical receptacle which allows light carrying communication information emitted from the light emitting element to be incident on an end face of an optical fiber.

Some optical modules are configured to monitor the intensity and amount of light emitted from a light emitting element for the purpose of stabilizing output characteristics of the light emitting element against temperature change and of adjusting light output.

For example, PTL 1 and PTL 2 describe a package type optoelectric converting device which includes a light emitting element and a light receiving element for monitoring. In the package type optoelectric converting device, part of the light emitted from the light emitting element is reflected to a side of the light receiving element as monitor light by a glass window of the package. However, when the package type optoelectric converting device described in PTL 1 and PTL 2 is driven at a high frequency, a crosstalk may occur due to an electromagnetic wave leaked from a wiring connected to the light emitting element, in which case, it is difficult to support high speed communication of 10 Gbps or higher. Further, it is difficult to downsize an optical module which uses the package type optoelectric converting device.

In contrast, a substrate-mounted optoelectric converting device, which has a light emitting element mounted on a circuit substrate, does not cause a crosstalk as does the package type optoelectric converting device and has an advantage that it is possible to reduce the number of parts and cost and can be downsized. However, because the substrate-mounted optoelectric converting device does not have a glass window, it is difficult to provide a function of generating monitor light at the side of the light emitting element.

To solve the above problems, for example, PTL 3 has proposed an optical module in which a reflecting surface for reflecting part of the light emitted from a light emitting element to a side of a light receiving element as monitor light is disposed at an optical receptacle. This configuration realizes stable high speed communication along with monitoring of output of the light emitting element.

CITATION LIST

Patent Literature

PTL 1
Japanese Patent Application Laid-Open No. 2000-340877

PTL 2
Japanese Patent Application Laid-Open No. 2004-221420
PTL 3
Japanese Patent Application Laid-Open No. 2008-151894

SUMMARY OF INVENTION

Technical Problem

In the optical module described in PTL 3, the light emitted from the light emitting element is extracted from the optical receptacle so as to be directed in a direction perpendicular to a substrate of the optoelectric converting device at an end face of an optical fiber. Depending on use modes of the optical module, however, it may be required to extract the light emitted from the light emitting element from the optical receptacle so that the light directs in a direction along the substrate at the end face of the optical fiber, in which case, it is required to employ a method which is different from that used in the invention described in PTL 3.

It is therefore an object of the present invention to provide an optical receptacle which can emit light emitted from a light emitting element in a direction along a substrate while extracting monitor light for monitoring the light emitting element and an optical module having the optical receptacle.

Solution to Problem

An optical receptacle according to the present invention is disposed between an optoelectric converting device and an optical fiber, the optoelectric converting device having a light emitting element and a light receiving element for monitoring light emitted from the light emitting element disposed on a substrate, and the optical receptacle optically couples the light emitting element and an end face of the optical fiber, and the optical receptacle includes a first optical surface which receives incidence of the light emitted from the light emitting element, a reflecting surface which reflects the light incident from the first optical surface in a direction along the substrate, a recess which has an emitting region for emitting part of light reflected at the reflecting surface and an incidence surface for receiving incidence of light emitted from the emitting region, a light separating section which is disposed in the emitting region, separates the light reflected at the reflecting surface into monitor light directed to the light receiving element and signal light directed to the end face of the optical fiber, and reflects the monitor light toward the light receiving element, while emitting the signal light to the recess, a second optical surface which emits the monitor light separated at the light separating section toward the light receiving element, and a third optical surface which emits the signal light, which has been emitted from the light separating section and incident from the incidence surface, toward the end face of the optical fiber, the light separating section has a plurality of splitting transmissive surfaces which transmit the light reflected at the reflecting surface and emit the light to the recess and a plurality of splitting reflecting surfaces formed in regions different from regions of the plurality of splitting transmissive surfaces, the splitting reflecting surfaces reflecting the light reflected at the reflecting surface toward the second optical surface, and the splitting transmissive surfaces are vertical surfaces with respect to the optical axis of the light reflected at the reflecting surface, the splitting reflecting surfaces are inclining surfaces with respect to the optical axis of the light reflected at the reflecting surface, and the splitting transmissive surfaces and the splitting reflecting surfaces are alternately disposed in a first direction which is an inclining direction of the splitting reflecting surfaces and in a second direction which is along the splitting reflecting surfaces and which is orthogonal to the first direction.

A optical module according to the present invention has an optoelectric converting device having a light emitting element and a light receiving element for monitoring light emitted from the light emitting element disposed on a substrate, and an optical receptacle according to the present invention.

Advantageous Effects of Invention

The optical module having the optical receptacle of the present invention can emit light emitted from the light emitting element in a direction along the substrate while monitoring the light emitted from the light emitting element.

DESCRIPTION OF EMBODIMENTS

Embodiments according to the present invention will be described in detail below with reference to the drawings.

Embodiment 1

Configuration of Optical Module

Figure 1:
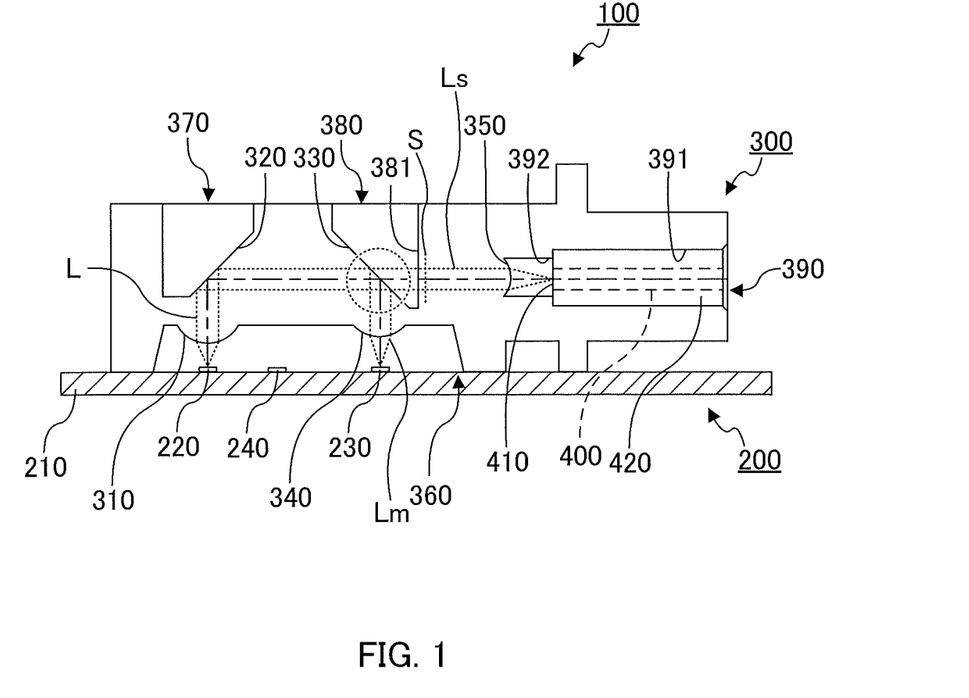
FIG. 1 is a cross-sectional view (view of optical paths) of an optical module according to Embodiment 1 of the present invention.

FIG. 1 is a cross-sectional view of optical module 100 according to Embodiment 1 of the present invention. In FIG. 1, a hatching of a cross section of optical receptacle 300 is omitted in order to illustrate optical paths inside optical receptacle 300.

As illustrated in FIG. 1, optical module 100 has substrate-mounted optoelectric converting device 200 including light emitting element 220, and optical receptacle 300. Optical module 100 is used with optical fiber 400 connected to optical receptacle 300. Optoelectric converting device 200 and optical receptacle 300 are fixed by publicly known fixing means such as an adhesive (for example, a thermosetting/ultraviolet curable resin). Optical receptacle 300 optically couples light emitting element 220 and an end face 410 of optical fiber 400 while optical receptacle 300 is disposed between optoelectric converting device 200 and optical fiber 400.

Optoelectric converting device 200 has semiconductor substrate 210, light emitting element 220, light receiving element 230 and control section 240.

Light emitting element 220 which is disposed on semiconductor substrate 210, emits laser light L in a direction vertical to a surface of semiconductor substrate 210. Light emitting element 220 is, for example, a Vertical Cavity Surface Emitting Laser (VCSEL).

Light receiving element 230 which is disposed on the same surface of semiconductor substrate 210 on which light emitting element 220 is disposed, receives monitor light Lm for monitoring output (for example, intensity and an amount of light) of laser light L emitted from light emitting element 220. Light receiving element 230 is, for example, a photodetector.

Control section 240 which is disposed on the same surface of semiconductor substrate 210 on which light emitting element 220 and light receiving element 230 are disposed, is electrically connected to light emitting element 220 and light receiving element 230 via a wiring which is not illustrated. Control section 240 controls output of laser light L emitted from light emitting element 220 based on intensity and an amount of monitor light Lm received by light receiving element 230.

Optical receptacle 300 is disposed on optoelectric converting device 200 so that first optical surface 310 faces light emitting element 220 and second optical surface 340 faces light receiving element 230. Optical receptacle 300 which is formed of an optically transparent material, is integrally manufactured by, for example, injection molding. Optical receptacle 300 allows light L emitted from light emitting element 220 of optoelectric converting device 200 to be incident inside through first optical surface 310 and separates light L into monitor light Lm and signal light Ls. Optical receptacle 300 emits monitor light Lm from second optical surface 340 toward light receiving element 230 of optoelectric converting device 200, and emits signal light Ls from third optical surface 350 toward an end face of optical fiber 400.

Because optical module 100 of the present embodiment is mainly characterized by a configuration of optical receptacle 300, optical receptacle 300 will be described separately in detail later.

As described above, optical fiber 400 is connected to optical receptacle 300. Optical fiber 400 is a single-mode optical fiber or a multi-mode optical fiber.

Configuration of Optical Receptacle

Figure 2A:
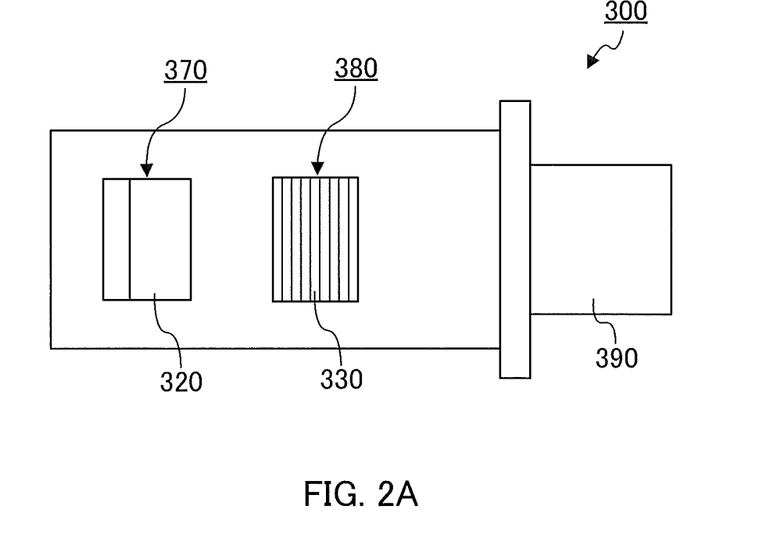
FIGS. 2A and 2B illustrate a configuration of an optical receptacle according to Embodiment 1.
Figure 2B:
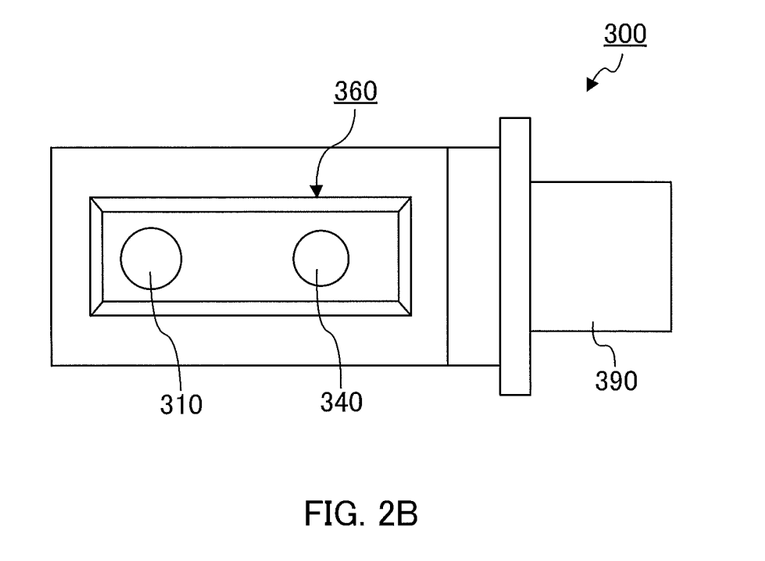

FIG. 2A is a plan view of optical receptacle 300, and FIG. 2B is a bottom view of optical receptacle 300. As illustrated in FIG. 1, FIGS. 2A and 2B, optical receptacle 300 is a member having a substantially rectangular parallelepiped shape. Optical receptacle 300 is formed using a material having optical transparency with respect to light of a wavelength used for optical communication. Examples of such a material include transparent resins such as polyetherimide and cyclic olefin resins. Optical receptacle 300 can be integrally manufactured by, for example, injection molding.

The shape of optical receptacle 300 will be described first using six faces (top face, bottom face, front face, back face, right side face and left side face) of this rectangular parallelepiped. The following description will be provided assuming that a face of optical receptacle 300 at a side of optical fiber 400 is a "right side face". It should be noted that when optical receptacle 300 is manufactured by injection molding, tapers may be formed at the right side face and at the left side face for punching.

As illustrated in FIG. 1 and FIG. 2B, first recess 360 in the shape of a square pyramid is formed on the bottom face. First recess 360 is space for accommodating light emitting element 220, light receiving element 230 and control section 240. A bottom face of first recess 360 is parallel to a surface of semiconductor substrate 210. On the bottom face of first recess 360, first optical surface 310 is formed so as to face light emitting element 220, and second optical surface 340 is formed so as to face light receiving element 230. It should be noted that the shape of first recess 360 should not particularly be limited, and may be, for example, a rectangular parallelepiped.

Further, on the top face, second recess 370 in the shape of a pentagonal prism and third recess 380 in the shape of a substantially pentagonal prism are formed side by side in a longitudinal direction of the rectangular parallelepiped. Part of an inner surface of second recess 370 serves as reflecting surface 320, while part of an inner surface of third recess 380 serves as light separating section 330 (incidence region), and an inner surface which faces light separating section 330 serves as incidence surface 381. It should be noted that the shape of second recess 370 should not particularly be limited as long as reflecting surface 320 can be disposed at a predetermined position. Further, the shape of third recess 380 should not particularly be limited as long as light separating section 330 and incidence surface 381 can be disposed at predetermined positions.

Further, on the right side face, cylindrical optical fiber mounting section 390 for connecting optical fiber 400 is provided. Optical fiber mounting section 390 has cylindrical fourth recess 391 and cylindrical fifth recess 392 formed on a bottom face of fourth recess 391. The fourth recess 391 is a portion for mounting cylindrical ferrule 420 attached to an end portion of optical fiber 400. The end portion of optical fiber 400 is disposed in parallel to the surface of semiconductor substrate 210 by being inserted into optical fiber mounting section 390 (fourth recess 391) with ferrule 420 being attached. On a bottom face of fifth recess 392, third optical surface 350 is formed so as to face end face 410 of mounted optical fiber 400. The central axis of third optical surface 350 corresponds with the central axis of end face 410 of optical fiber 400.

Optical components of optical receptacle 300 will be described next.

As illustrated in FIG. 1, FIGS. 2A and 2B, optical receptacle 300 has first optical surface 310, reflecting surface 320, light separating section 330, second optical surface 340, incidence surface 381 and third optical surface 350.

First optical surface 310 is disposed on a side of the bottom face of optical receptacle 300 so as to face light emitting element 220. In the present embodiment, first optical surface 310 is a convex lens surface. First optical surface 310 allows light L emitted from light emitting element 220 to be incident inside optical receptacle 300. At this time, first optical surface 310 converts incident light L into collimated light L. Collimated light L converted by first optical surface 310 moves forth toward reflecting surface 320. The central axis of first optical surface 310 is perpendicular to a light emitting surface of light emitting element 220 (and the surface of semiconductor substrate 210). The central axis of first optical surface 310 preferably corresponds with the optical axis of light L emitted from light emitting element 220.

Reflecting surface 320 is an inclining surface formed at a side of the top face of optical receptacle 300. Reflecting surface 320 is inclined so as to approach optical fiber 400 as reflecting surface 320 approaches the top face from the bottom face of optical receptacle 300. In the present embodiment, an inclining angle of reflecting surface 320 is 45° with respect to the optical axis of light L incident from first optical surface 310. On reflecting surface 320, collimated light L incident from first optical surface 310 is internally incident at an incidence angle greater than a critical angle. Reflecting surface 320 totally reflects incident light L in a direction along the surface of semiconductor substrate 210.

Light separating section 330 (an incidence region of third recess 380) which is a region comprised of a plurality of faces, is disposed at a side of the top face of optical receptacle 300. Light separating section 330 separates collimated light L reflected at reflecting surface 320 into monitor light Lm directed to light receiving element 230 and signal light Ls directed to end face 410 of optical fiber 400. Signal light Ls is emitted to third recess 380. As optical module 100 of the present embodiment is mainly characterized by light separating section 330 of optical receptacle 300, light separating section 330 will be described separately in detail later.

Second optical surface 340 is disposed at a side of the bottom face of optical receptacle 300 so as to face light receiving element 230. In the present embodiment, second optical surface 340 is a convex lens surface. Second optical surface 340 converges collimated light L separated at light separating section 330 and emits the converged light to light receiving element 230. By this means, it is possible to efficiently couple monitor light Lm to light receiving element 230. The central axis of second optical surface 340 is preferably perpendicular to a light receiving surface (semiconductor substrate 210) of light receiving element 230.

Incidence surface 381 which is disposed at a side of the top face of optical receptacle 300, allows signal light Ls emitted from light separating section 330 to be incident again inside optical receptacle 300. In the present embodiment, incidence surface 381 is a vertical surface with respect to signal light Ls separated at light separating section 330. By this means, it is possible to allow signal light Ls directed to end face 410 of optical fiber 400 to be incident inside optical receptacle 300 without being refracted.

Third optical surface 350 is disposed at a side of the right side face of optical receptacle 300 so as to face end face 410 of optical fiber 400. In the present embodiment, third optical surface 350 is a convex lens surface. Third optical surface 350 converges signal light Ls (collimated light L) incident inside optical receptacle 300 from incidence surface 381 and emits the converged light to end face 410 of optical fiber 400. By this means, it is possible to efficiently couple signal light Ls to end face 410 of optical fiber 400. The central axis of third optical surface 350 preferably corresponds with the central axis of end face 410 of optical fiber 400.

Because in optical receptacle 300 of the present embodiment, light L emitted from light emitting element 220 is allowed to be incident after being converted into collimated light (parallel light) having a constant light flux diameter by first optical surface 310, it is possible to treat only the collimated light. By this means, even if measurement errors occur in optical receptacle 300 in a traveling direction of collimated light L, Ls and Lm, it is possible to secure an amount of light to end face 410 of optical fiber 400 and to light receiving element 230 and a position where incident light is concentrated on optical fiber 400 and light receiving element 230. As a result, it is possible to relax measurement accuracy required for optical receptacle 300 and improve manufacturability while maintaining optical performance.

Figure 3A:
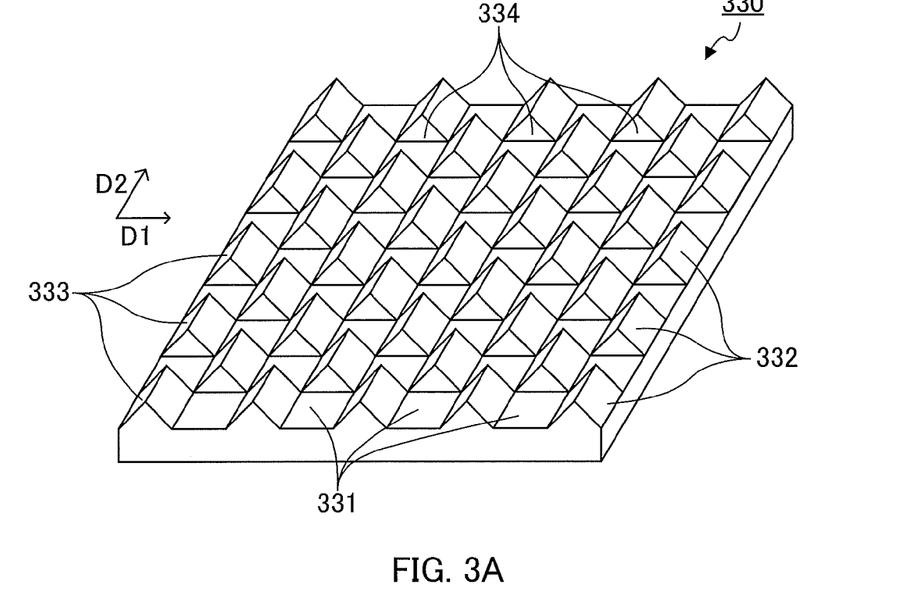
FIGS. 3A and 3B illustrate a configuration of a light separating section.
Figure 3B:
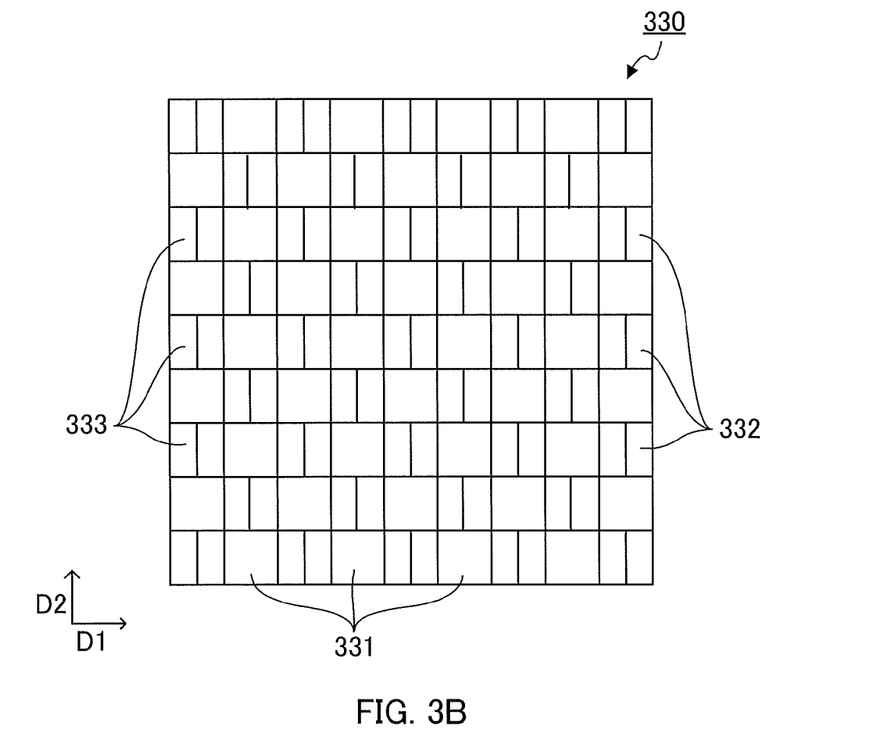
Figure 4A:
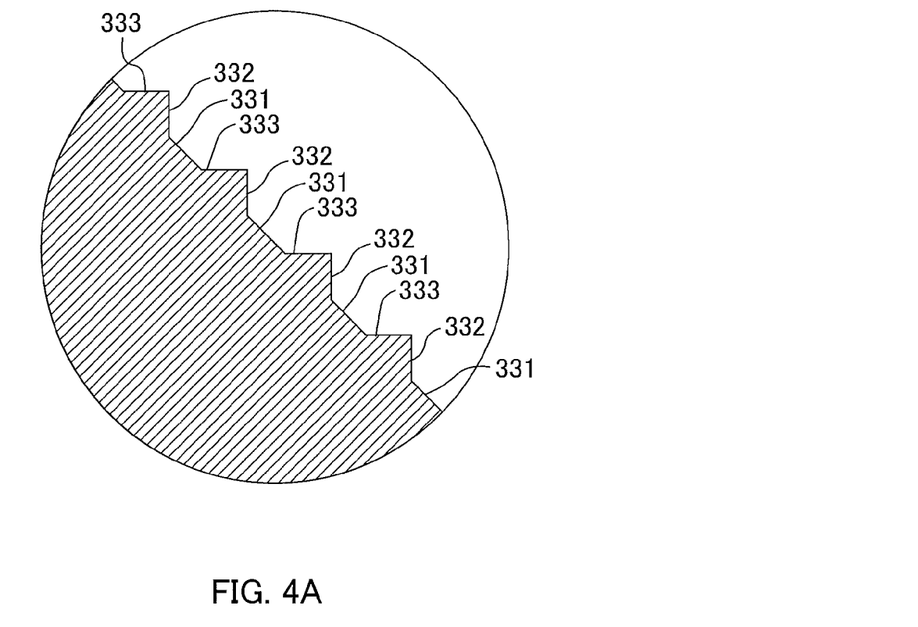
FIGS. 4A and 4B are partial enlarged views illustrating the configuration of the light separating section.
Figure 4B:
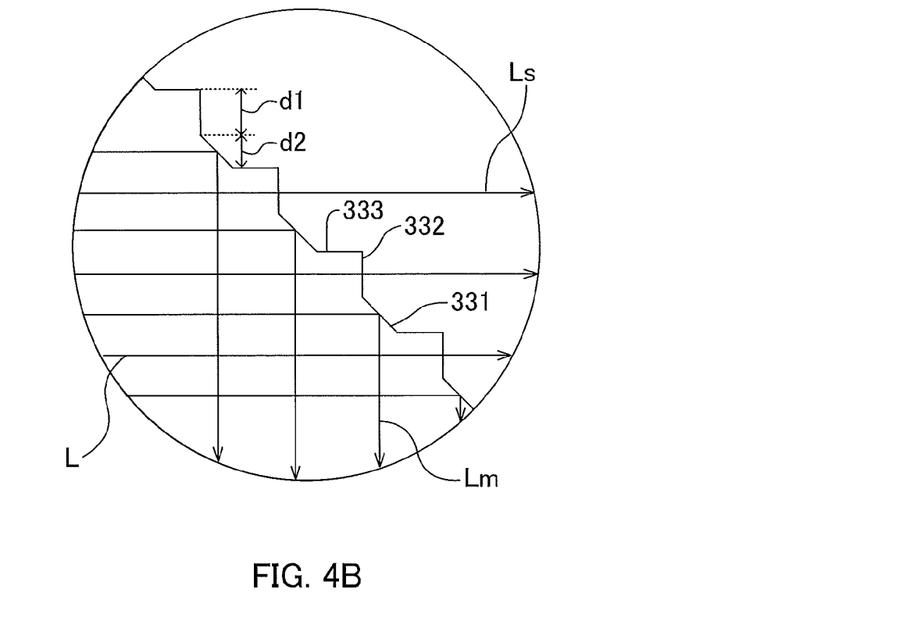

A configuration of light separating section 330 will be described next. FIGS. 3A, 3B, 4A and 4B illustrate the configuration of light separating section 330. FIG. 3A is a perspective view of light separating section 330, and FIG. 3B is a plan view of light separating section 330. FIG. 4A is a partial enlarged cross-sectional view of a region indicated with a dashed line in FIG. 1, and FIG. 4B is a partial enlarged cross-sectional view illustrating optical paths of light separating section 330. In FIG. 4B, a hatching of a cross section of optical receptacle 300 is omitted in order to illustrate the optical paths inside optical receptacle 300.

As illustrated in FIGS. 3A, 3B, 4A and 4B, light separating section 330 has a plurality of splitting reflecting surfaces 331, a plurality of splitting transmissive surfaces 332, a plurality of splitting stepped surfaces 333, and a plurality of end faces 334. Splitting reflecting surfaces 331 is alternated with splitting transmissive surfaces 332 and splitting stepped surfaces 333 in a first direction and in a second direction which is orthogonal to the first direction so as to form a matrix shape. The "first direction" is an inclining direction of splitting reflecting surfaces 331 which will be described later (see arrow D1 indicated in FIGS. 3A and 3B). Further, the "second direction" is a direction along splitting reflecting surfaces 331 and orthogonal to the first direction (see arrow D2 indicated in FIGS. 3A and 3B).

Splitting reflecting surfaces 331 are inclining surfaces with respect to the optical axis of light L reflected at reflecting surface 320. Splitting reflecting surfaces 331 are inclined to approach optical fiber 400 as splitting reflecting surfaces 331 approach to the bottom face from the top face of optical receptacle 300. In the present embodiment, an inclining angle of splitting reflecting surfaces 331 is 45° with respect to the optical axis of light L reflected at reflecting surface 320. The plurality of splitting reflecting surfaces 331 are disposed on the same plane. Further, splitting reflecting surfaces 331 are disposed in the first direction and in the second direction at predetermined intervals. Between splitting reflecting surfaces 331 which are adjacent in the first direction, splitting transmissive surfaces 332 and splitting stepped surfaces 333 are disposed. Meanwhile, between splitting reflecting surfaces 331 which are adjacent to each other in the second direction, splitting transmissive surfaces 332, splitting stepped surfaces 333 and a pair of end faces 334 are disposed. Intervals between splitting reflecting surfaces 331 in the first direction and in the second direction are not particularly limited. In the present embodiment, intervals between splitting reflecting surfaces 331 are the same between in the first direction and in the second direction.

Splitting transmissive surfaces 332 are surfaces which are formed at positions different from splitting reflecting surfaces 331 and which are perpendicular to the optical axis of light L reflected at reflecting surface 320. Splitting transmissive surfaces 332 are also disposed in the first direction and in the second direction at predetermined intervals. The plurality of splitting transmissive surfaces 332 are disposed in parallel to each other in the first direction, and disposed on the same plane in the second direction.

Splitting stepped surfaces 333 which are surfaces parallel to the optical axis of light L reflected at reflecting surfaces 320, connect splitting reflecting surfaces 331 and splitting transmissive surfaces 332. Splitting stepped surfaces 333 are also disposed in the first direction and in the second direction at predetermined intervals. The plurality of splitting stepped surfaces 333 are disposed in parallel to each other in the first direction and disposed on the same plane in the second direction.

End faces 334 are surfaces parallel to the optical axis of light L reflected at reflecting surface 320, and surfaces perpendicular to splitting transmissive surfaces 332 and splitting stepped surfaces 333. End faces 334 which are disposed at both ends of splitting transmissive surfaces 332 and splitting stepped surfaces 333 in the second direction, connect the both ends of splitting transmissive surfaces 332 and splitting stepped surfaces 333, and splitting reflecting surfaces 331. The plurality of end faces 334 are disposed on the same plane in the first direction, and disposed in parallel to each other in the second direction.

Ridge lines are formed between splitting transmissive surfaces 332 and splitting stepped surfaces 333. A plurality of ridge lines adjacent in the first direction are disposed in parallel to each other. Further, a plurality of ridge lines adjacent in the second direction are disposed on the same straight line. In the present embodiment, a smaller angle formed by splitting transmissive surfaces 332 and splitting stepped surfaces 333 is 90°. Further, a smaller angle formed by splitting transmissive surfaces 332 and splitting reflecting surfaces 331 is 135°. Still further, a smaller angle formed by splitting stepped surfaces 333 and splitting reflecting surfaces 331 is also 135°. That is, splitting transmissive surfaces 332 and splitting stepped surfaces 333 are formed in the same rectangular shape.

As illustrated in FIG. 4B, light L reflected at reflecting surface 320 is internally incident on splitting reflecting surfaces 331 at an incidence angle greater than a critical angle. Splitting reflecting surfaces 331 reflect incident light L toward second optical surface 340 to generate monitor light Lm. Meanwhile, splitting transmissive surfaces 332 transmit light L reflected at reflecting surface 320 to generate signal light Ls to be directed to end face 410 of optical fiber 400. Signal light Ls is emitted to third recess 380. At this time, because splitting transmissive surfaces 332 are vertical surfaces with respect to light L, signal light Ls is not refracted. It should be noted that because splitting stepped surfaces 333 and end faces 334 are formed in parallel to an incident direction of light L, light L is not incident on splitting stepped surfaces 333 and end faces 334.

A ratio of an amount of signal light Ls and an amount of monitor light Lm generated at light separating section 330 should not particularly be limited. The ratio of the amount of signal light Ls and the amount of monitor light Lm is proportional to a ratio of an area of splitting transmissive surfaces 332 and an area of splitting reflecting surfaces 331 with respect to light L incident on light separating section 330. For example, it is assumed that a ratio of size d1 of splitting transmissive surface 332 and size d2 of splitting reflecting surface 331 in a cross section illustrated in FIG. 4B in a direction parallel to splitting transmissive surface 332 is 1:1. In this case, signal light Ls and monitor light Lm are generated at 50% each when the light incident on light separating section 330 is assumed to be 100%.

A reason why splitting reflecting surfaces 331 and splitting transmissive surfaces 332 are disposed alternately in the both directions of the first direction and the second direction will be described next.

Figure 5:
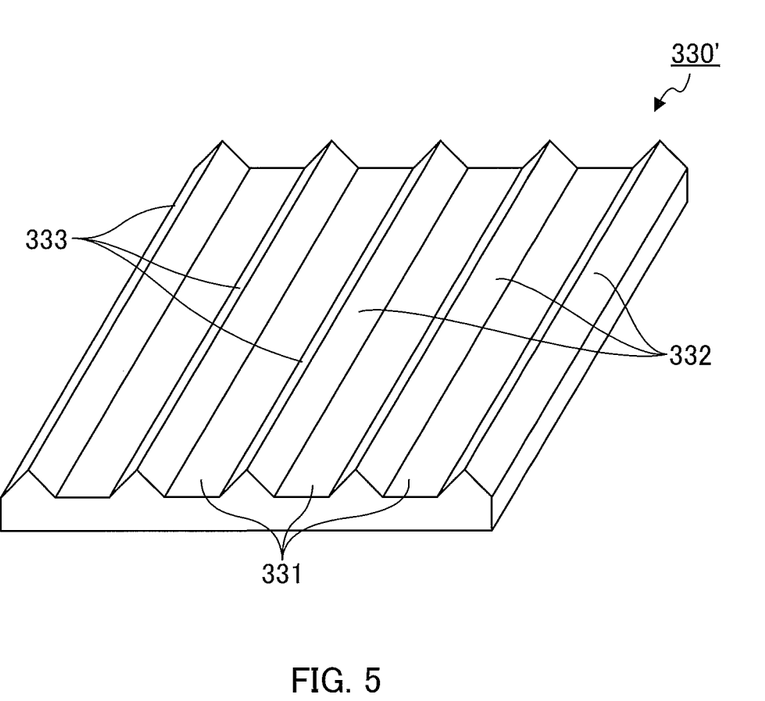
FIG. 5 is a perspective view of a light separating section of an optical receptacle for comparison.
Figure 6A:
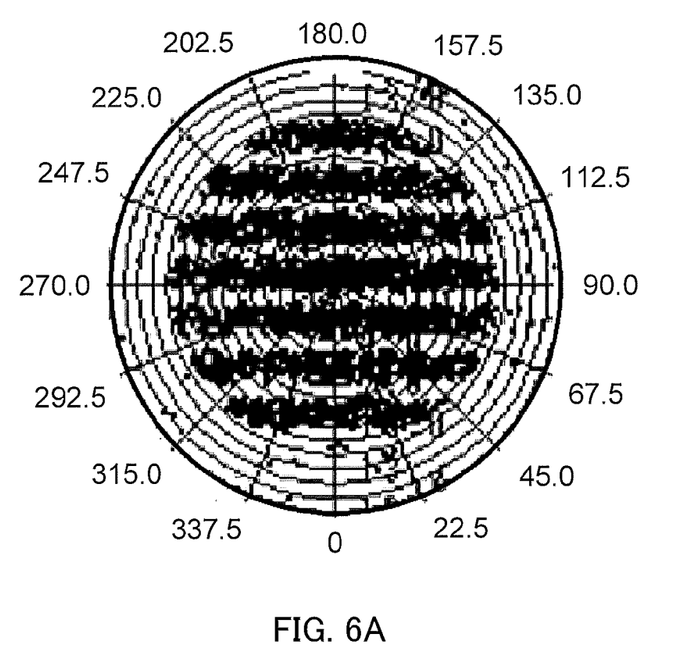
FIGS. 6A and 6B illustrate spot-shaped simulations on optical paths of signal light.
Figure 6B:
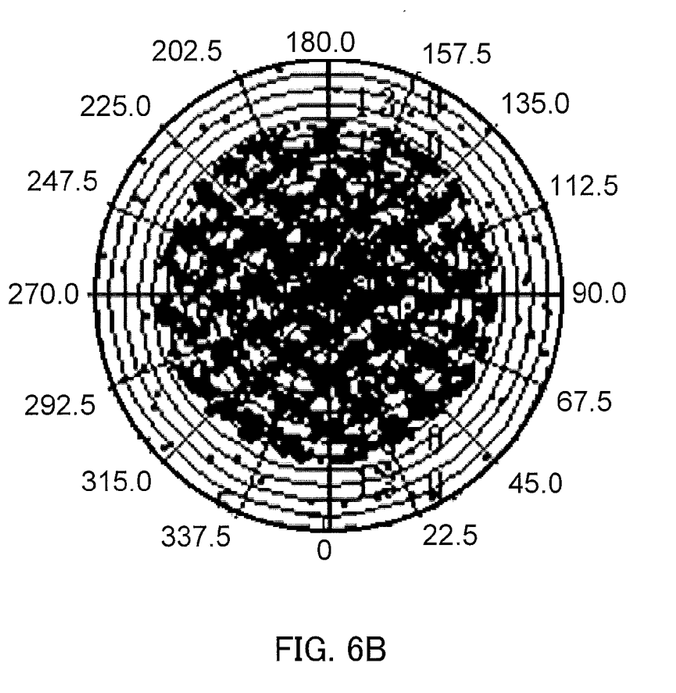

As described above, FIG. 3A is a perspective view of light separating section 330 of optical receptacle 300 according to the present embodiment, while FIG. 5 is a perspective view of light separating section 330' for comparison. FIG. 6A is a simulation in a beam spot shape of signal light Ls on virtual plane S in a case where signal light Ls is generated using light separating section 330' for comparison. FIG. 6B is a simulation in a beam spot shape of signal light Ls on virtual plane S in a case where signal light Ls is generated using light separating section 330 according to the present embodiment. In this simulation, virtual plane S is set near incidence surface 381 as illustrated in FIG. 1.

As illustrated in FIG. 5, light separating section 330' for comparison differs from light separating section 330 according to the present embodiment in that splitting reflecting surfaces 331 and splitting transmissive surfaces 332 are disposed alternately only in an inclining direction of splitting reflecting surfaces 331. When light separating section 330' for comparison is used, the beam spots form a stripe pattern as illustrated in FIG. 6A.

In contrast, when light separating section 330 according to the present embodiment is used, as illustrated in FIG. 6B, beam spots form a matrix pattern. It should be noted that because third optical surface 350 has a circular shape in a plan view, an outline of a cross section of signal light Ls reaching end face 410 of optical fiber 400 becomes a circular shape. Further, because the beam spots in a case where light separating section 330 according to the present embodiment is used form a matrix pattern, optical receptacle 300 is less likely to be affected by distribution of angular intensity of light emitting element 220 compared to a case where light separating section 330' for comparison is used.

Effects

As described above, optical receptacle 300 according to Embodiment 1 reflects laser light L emitted from light emitting element 220 along the surface of semiconductor substrate 210 using reflecting surface 320 and splits the light into monitor light Lm and signal light Ls by reflection by splitting reflecting surfaces 331 and transmission by splitting transmissive surfaces 332. Monitor light Lm is emitted toward light receiving element 230 from second optical surface 340, and signal light Ls is emitted toward end face 410 of optical fiber 400 from third optical surface 350 without changing its traveling direction. Accordingly, optical receptacle 300 can direct signal light Ls at end face 410 of optical fiber 400 to a direction along semiconductor substrate 210 while acquiring monitor light Lm for monitoring the light emitted from light emitting element 220. Further, optical receptacle 300 is less likely to be affected by distribution of angular intensity of light emitting element 220.

Modified Examples

While in optical receptacle 300 according to Embodiment 1, the light incident at first optical surface 310 is converted into collimated light, first optical surface 310 may convert the incident light into light other than collimated light.

Figure 7A:
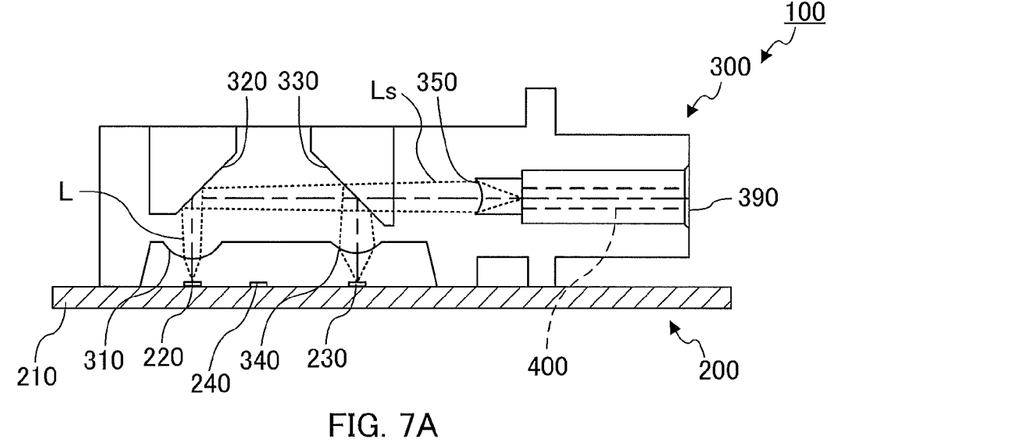
FIGS. 7A to 7C are cross-sectional views (views of optical paths) of optical modules according to Modified Examples 1 to 3 of Embodiment 1.
Figure 7B:
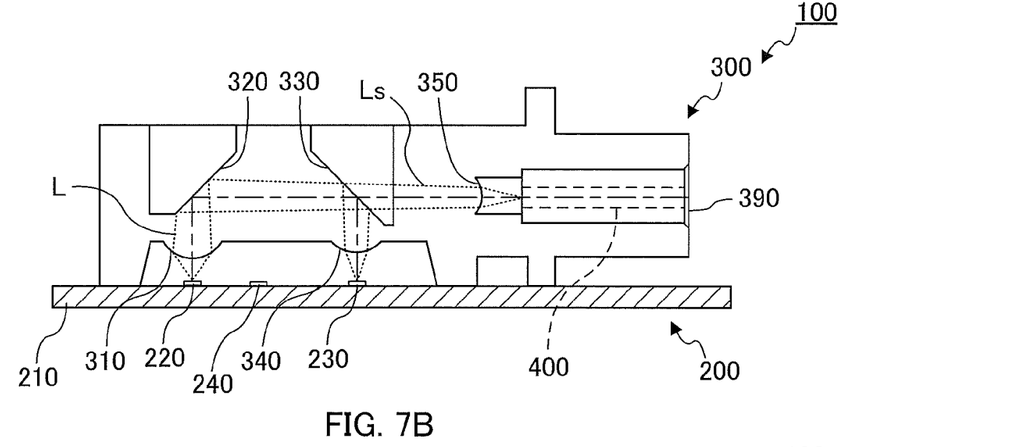
Figure 7C:
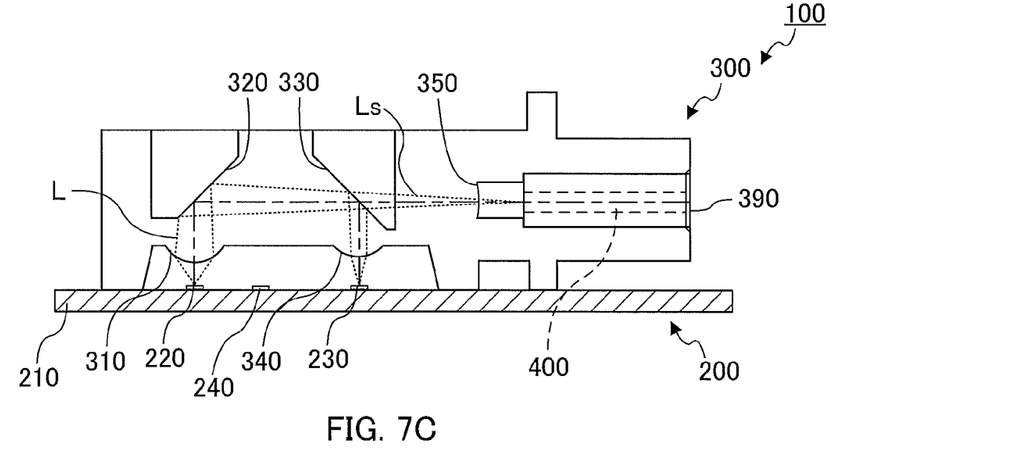

FIGS. 7A to 7C are cross-sectional views (views of optical paths) of optical module 100 according to Modified Examples 1 to 3 of Embodiment 1. FIG. 7A illustrate optical paths of optical module 100 in a case where first optical surface 310 converts laser light L so that a light flux diameter gradually increases as laser light L moves forth. FIGS. 7B and 7C illustrate optical paths of optical module 100 in a case where first optical surface 310 converts laser light L so that a light flux diameter gradually decreases as laser light L moves forth. In FIGS. 7A to 7C, a hatching of the cross section of optical receptacle 300 is omitted in order to illustrate optical paths inside optical receptacle 300. Optical receptacle 300 and optical module 100 according to these Modified Examples have a light flux diameter of light L emitted from light emitting element 220 within optical receptacle 300 different from that of optical receptacle 300 and optical module 100 of Embodiment 1. It should be noted that the same reference numerals are assigned to components which are the same as those of optical receptacle 300 and optical module 100 of Embodiment 1, and the explanation thereof will be omitted.

As illustrated in FIG. 7A, in optical module 100 according to Modified Example 1, first optical surface 310 converts laser light L so that a light flux diameter gradually increases as laser light L moves forth. This configuration can be accomplished by, for example, attenuating positive power (refractive power) of first optical surface 310 (convex lens surface) compared to a configuration of Embodiment 1. By this means, because a diameter can be expanded as signal light Ls moves forth, even if foreign substances are attached or scars are formed on third optical surface 350, it is possible to reduce an area proportion of foreign substances/scars with respect to signal light Ls on third optical surface 350, so that it is possible to effectively mitigate influence on combining efficiency by foreign substances/scars on third optical surface 350.

Further, as illustrated in FIG. 7B, in optical module 100 according to Modified Example 2, first optical surface 310 converts a light flux so that a light flux diameter gradually decreases as laser light L moves forth. This configuration can be realized by, for example, strengthening positive power (refractive power) of first optical surface 310 (convex lens surface) compared to the configuration of Embodiment 1.

Still further, as illustrated in FIG. 7C, in optical module 100 according to Modified Example 3, because light L is effectively converged before light L reaches third optical surface 350, it is only necessary to converge light L on third optical surface 350 which has small power (refractive power).

Further, while a case has been described where, in optical receptacle 300 according to Embodiment 1, first optical surface 310, second optical surface 340 and third optical surface 350 are lens surfaces having curvature, first optical surface 310, second optical surface 340 or third optical surface 350 may be a plane which does not have curvature.

Figure 8A:
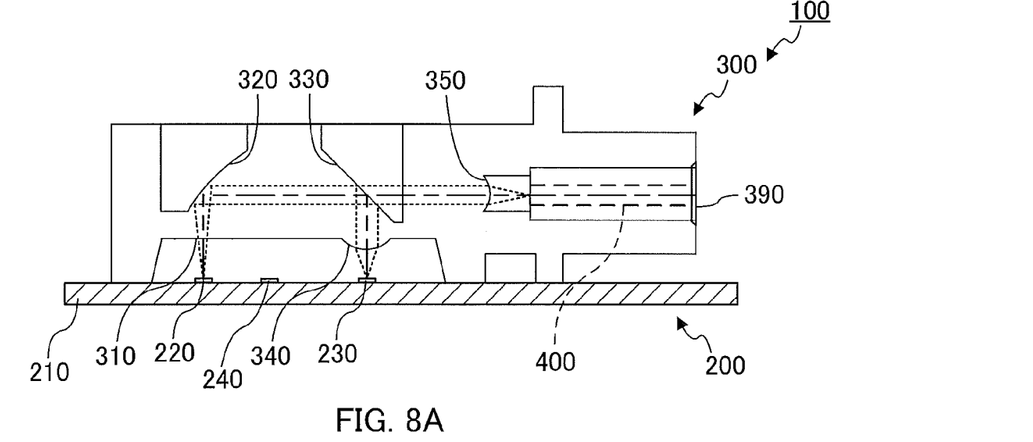
FIGS. 8A to 8C are cross-sectional views (views of optical paths) of optical modules according to Modified Examples 4 to 6 of Embodiment 1.
Figure 8B:
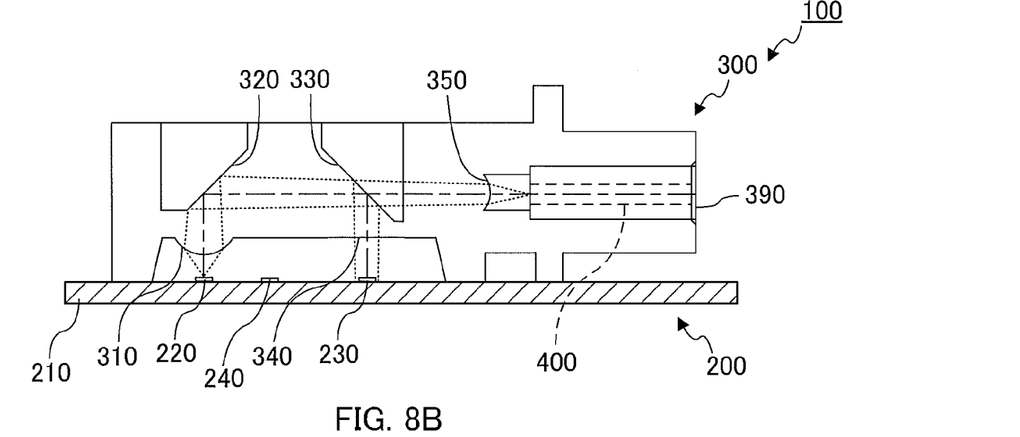
Figure 8C:
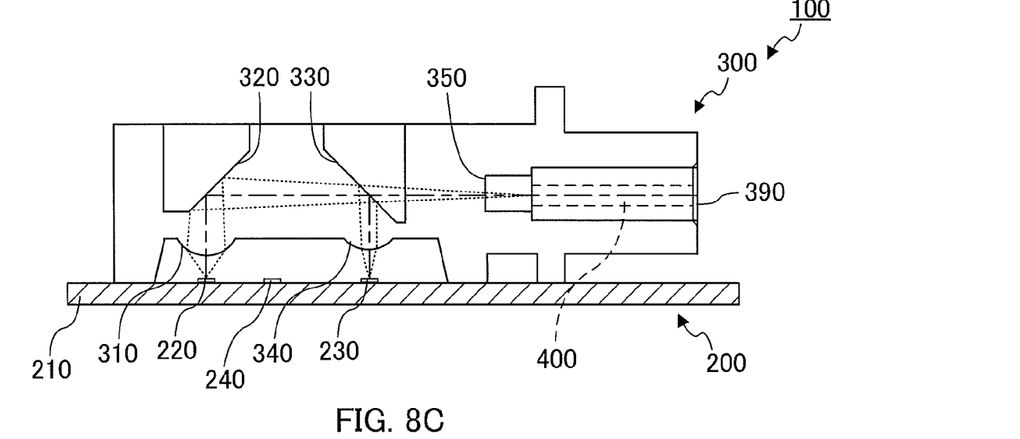

FIGS. 8A to 8C are cross-sectional views (views of optical paths) of optical module 100 according to Modified Examples 4 to 6 of Embodiment 1. FIG. 8A illustrates optical paths of optical module 100 in a case where first optical surface 310 is a plane. FIG. 8B illustrates optical paths of optical module 100 in a case where second optical surface 340 is a plane. FIG. 8C illustrates optical paths of optical module 100 in a case where third optical surface 350 is a plane. In FIGS. 8A to 8C, a hatching of a cross section of optical receptacle 300 is omitted in order to illustrate optical paths inside optical receptacle 300.

As illustrated in FIG. 8A, in optical module 100 according to Modified Example 4, first optical surface 310 is formed in a planar shape. In this case, for example, reflecting surface 320 is formed so as to be able to serve as a concave mirror.

Further, as illustrated in FIG. 8B, in optical module 100 according to Modified Example 5, second optical surface 340 is formed in a planar shape. In this case, part of the light emitted from second optical surface 340 may not reach a light receiving surface of light receiving element 230, which, however, is not a serious problem for light receiving element 230 to monitor light L emitted from light emitting element 220.

Still further, as illustrated in FIG. 8C, in optical module 100 according to Modified Example 6, third optical surface 350 is formed in a planar shape. If light L immediately before reaching third optical surface 350 is effectively converged by first optical surface 310, reflecting surface 320, or the like, third optical surface 350 may be formed in a planar shape.

Embodiment 2

Configuration of Optical Module

Optical receptacle 600 and optical module 500 according to Embodiment 2 which are lens array type optical receptacle and optical module, are different from optical receptacle 300 and optical module 100 according to Embodiment 1 in that optical receptacle 600 and optical module 500 allow for multi-channel optical communication along with monitoring. It should be noted that the same reference numerals are assigned to the components which are the same as those of optical receptacle 300 and optical module 100 of Embodiment 1 and the explanation thereof will be omitted.

Figure 9:
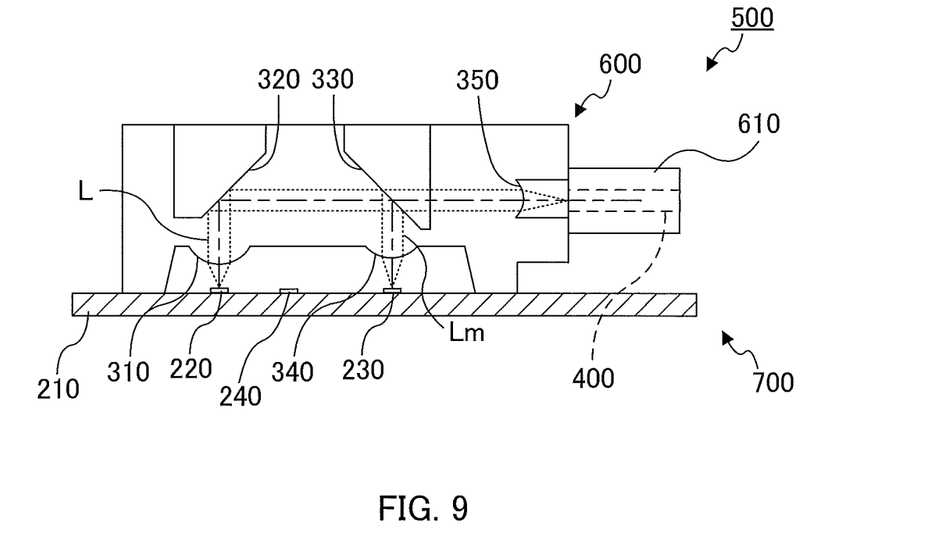
FIG. 9 is a cross-sectional view (view of optical paths) of an optical module according to Embodiment 2.
Figure 10A:
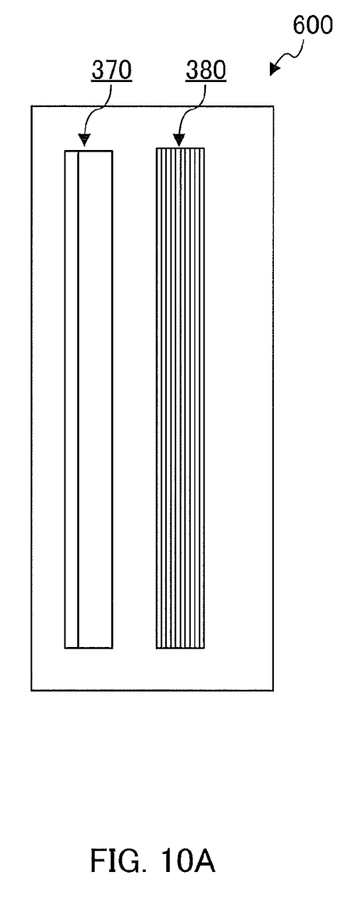
FIGS. 10A to 10C illustrate a configuration of an optical receptacle according to Embodiment 2.
Figure 10B:
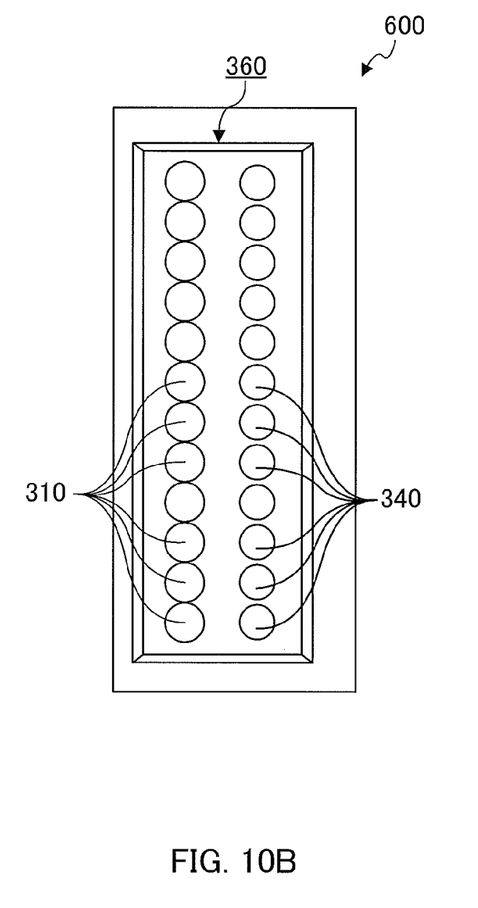
Figure 10C:
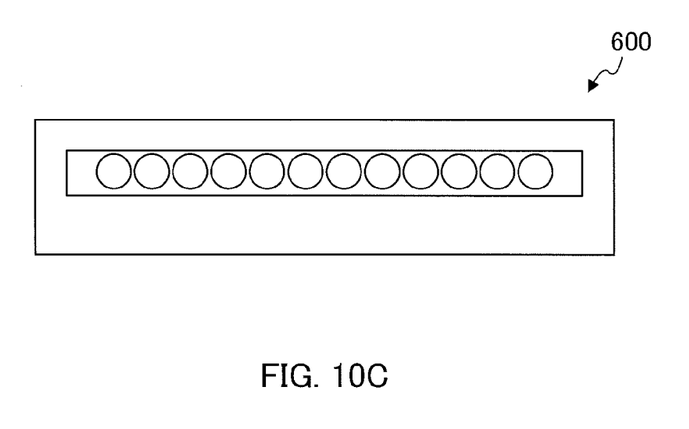

FIG. 9 is a cross-sectional view of optical module 500 according to Embodiment 2. In FIG. 9, a hatching of a cross section of optical receptacle 600 is omitted in order to illustrate optical paths inside optical receptacle 600. FIGS. 10A to 10C illustrate a configuration of optical receptacle 600 according to Embodiment 2. FIG. 10A is a plan view of optical receptacle 600, FIG. 10B is a bottom view of optical receptacle 600, and FIG. 10C illustrates a right side face of optical receptacle 600.

As illustrated in FIG. 9, optical module 500 according to Embodiment 2 has optoelectric converting device 700 and optical receptacle 600. In optical module 500 according to Embodiment 2, optical fiber 400 is attached to optical receptacle 600 via publicly known mounting means with optical fiber 400 accommodated in multicore batch connector 610.

Optoelectric converting device 700 has a plurality of light emitting elements 220, a plurality of light receiving elements 230 and control section 240. The plurality of light emitting elements 220 are disposed in line on semiconductor substrate 210. In FIG. 9, the plurality of light emitting elements 220 are disposed in line from a front side toward a back side on the sheet. Meanwhile, the plurality of light receiving elements 230 are disposed in line on semiconductor substrate 210 so as to be parallel to a direction the plurality of light emitting elements 220 are disposed. The plurality of light emitting elements 220 and the plurality of light receiving elements 230 are disposed at the same intervals so as to correspond to each other. The plurality of light receiving elements 230 receive monitor light Lm for monitoring output of corresponding light emitting elements 220, or the like.

Optical receptacle 600 is formed so as to secure optical paths between each light emitting element 220 and each optical fiber 400 and optical paths between each light emitting element 220 and each light receiving element 230 according to such configurations of optoelectric converting device 700 and optical fiber 400. Specifically, in optical receptacle 600, the plurality of first optical surfaces 310, the plurality of second optical surfaces 340 and the plurality of third optical surfaces 350 are disposed in a front-back direction with respect to the plane of the sheet of FIG. 9 (vertical direction in FIGS. 10A and 10B) so as to secure an optical path of laser light L for each light emitting element 220. Further, in optical receptacle 600, reflecting surface 320 and light separating section 330 are formed in a size which can secure optical paths of laser light L emitted from the plurality of light emitting elements 220.

Effects

As described above, in addition to the effect of Embodiment 1, optical module 500 according to Embodiment 2 allows for multichannel optical communication along with monitoring.

Modified Examples

As with the Modified Examples of Embodiment 1, also in optical receptacle 600 according to Embodiment 2, first optical surface 310 may convert the incident light into light other than collimated light.

Figure 11A:
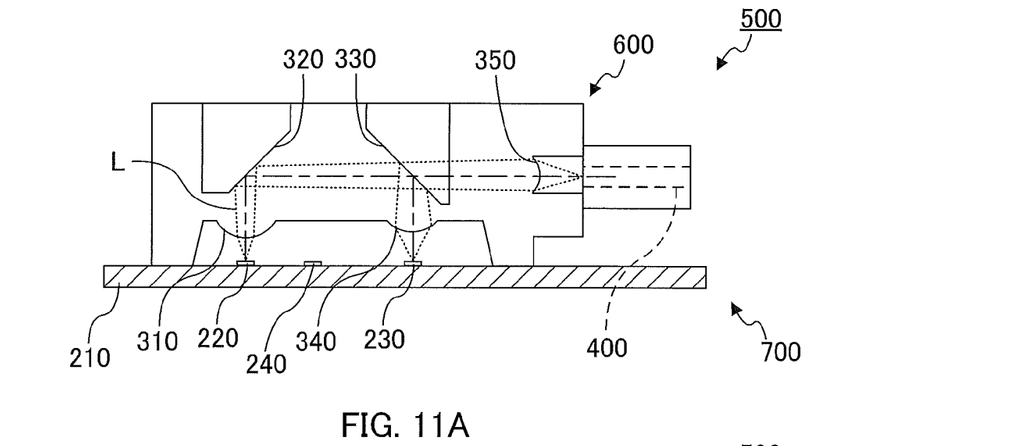
FIGS. 11A to 11C are cross-sectional views (views of optical paths) of optical modules according to Modified Examples 1 to 3 of Embodiment 2.
Figure 11B:
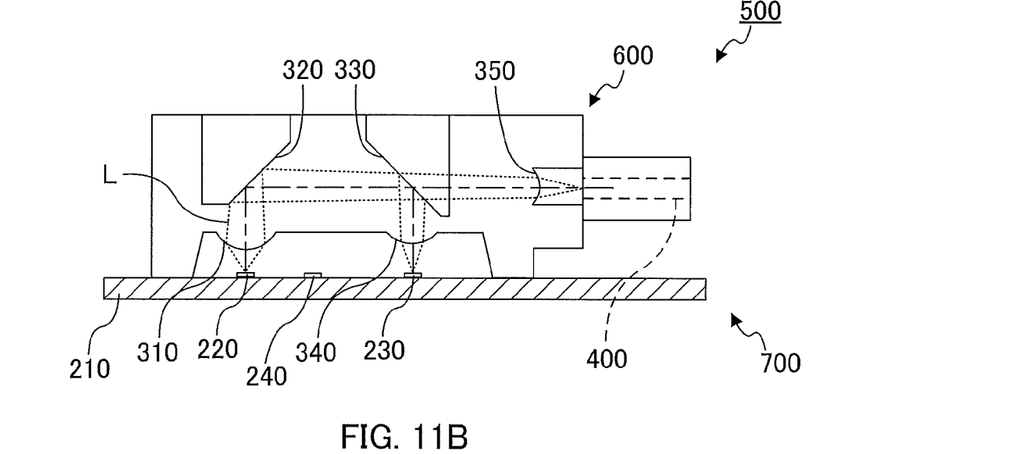
Figure 11C:
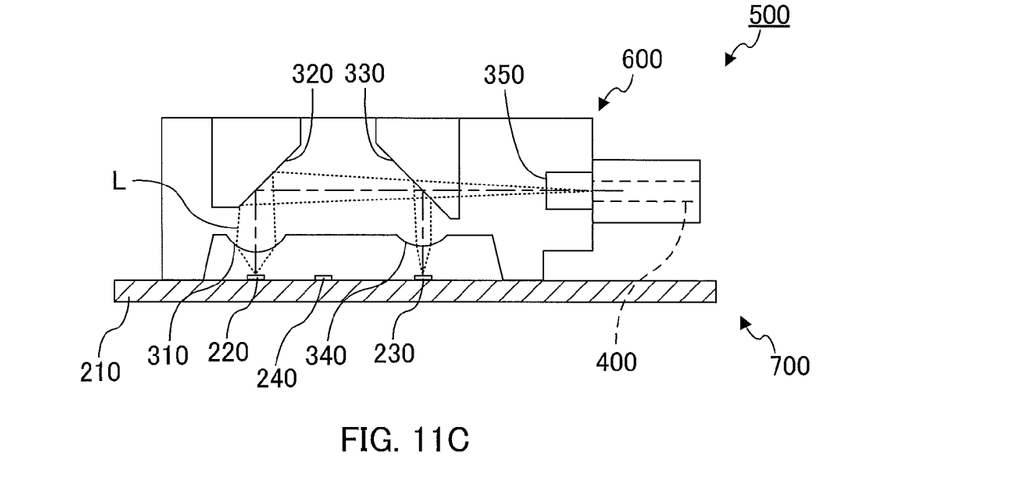

FIGS. 11A to 11C are cross-sectional views (views of optical paths) of optical module 500 according to Modified Examples 1 to 3 of Embodiment 2. FIG. 11A illustrates optical paths of optical module 500 in a case where first optical surface 310 converts laser light L so that a light flux diameter gradually increases as laser light L moves forth. FIG. 11B illustrates optical paths of optical module 500 in a case where first optical surface 310 converts laser light L so that a light flux diameter gradually decreases as laser light L moves forth. FIG. 11C illustrates optical paths of optical module 500 in a case where first optical surface 310 converts laser light L so that a light flux diameter gradually decreases as laser light L moves forth.

As illustrated in FIG. 11A, in optical module 500 according to Modified Example 1, first optical surface 310 converts a light flux so that a light flux diameter gradually increases as laser light L moves forth in a traveling direction. Further, as illustrated in FIG. 11B, in optical module 500 according to Modified Example 2, first optical surface 310 converts a light flux so that a light flux diameter gradually decreases as laser light L moves forth in the traveling direction. Still further, as illustrated in FIG. 11C, in optical module 500 according to Modified Example 3, because light L is effectively converged before reaching third optical surface 350, it is not necessary to converge light L at third optical surface 350.

It should be noted, though not particularly illustrated, that also in Embodiment 2, first optical surface 310, second optical surface 340 and third optical surface 350 may be planes as with Embodiment 1.

Further, in optical receptacles 300 and 600 in the above-described embodiments, it is also possible to form a reflective coating such as a thin film of a metal (for example, Al, Ag and Au) having high optical reflectivity on reflecting surface 320 and splitting reflecting surfaces 331. If reduction in the number of parts is prioritized, it is preferable to employ a configuration which utilizes only total reflection as in Embodiments 1 and 2.

INDUSTRIAL APPLICABILITY

The optical receptacle and the optical module according to the present invention are useful in optical communication using optical fibers.

REFERENCE SIGNS LIST 100, 500 Optical module
200, 700 Optoelectric converting device
210 Semiconductor substrate
220 Light emitting element
230 Light receiving element
240 Control section
300, 600 Optical receptacle
310 First optical surface
320 Reflecting surface
330 Light separating section
331 Splitting reflecting surface
332 Splitting transmissive surface
333 Splitting stepped surface
334 End face
340 Second optical surface 350 Third optical surface
360 First recess
370 Second recess
380 Third recess
381 Incidence surface
390 Optical fiber mounting section
391 Fourth recess
392 Fifth recess
400 Optical fiber
410 End face
610 Connector
L Light emitted from light emitting element
Lm Monitor light
Ls Signal light
S Virtual plane

The invention claimed is:

1. An optical receptacle disposed between an optoelectric converting device and an optical fiber, the optoelectric converting device having a light emitting element and a light receiving element for monitoring light emitted from the light emitting element disposed on a substrate, the optical receptacle optically coupling the light emitting element and an end face of the optical fiber, the optical receptacle comprising:
   a first optical surface which receives the light emitted from the light emitting element;
   a reflecting surface which reflects light incident from the first optical surface in a direction along the substrate;
   a recess which has an emitting region for emitting part of the light reflected at the reflecting surface and an incidence surface for receiving incidence of the light emitted from the emitting region;
   a light separating section which is disposed in the emitting region, separates the light reflected at the reflecting surface into monitor light directed to the light receiving element and signal light directed to the end face of the optical fiber, and reflects the monitor light toward the light receiving element while emitting the signal light to the recess;
   a second optical surface which emits the monitor light separated at the light separating section toward the light receiving element; and
   a third optical surface which emits the signal light, which has been emitted from the light separating section and then incident from the incidence surface, toward the end face of the optical fiber, wherein
   the light separating section has a plurality of splitting transmissive surfaces which transmit the light reflected at the reflecting surface and emit the light to the recess and a plurality of splitting reflecting surfaces formed in regions different from regions of the plurality of splitting transmissive surfaces, the splitting reflecting surfaces reflecting the light reflected at the reflecting surface toward the second optical surface,
   the splitting transmissive surfaces are vertical surfaces with respect to an optical axis of the light reflected at the reflecting surface,
   the splitting reflecting surfaces are inclining surfaces with respect to the optical axis of the light reflected at the reflecting surfaces, and
   the splitting transmissive surfaces and the splitting reflecting surfaces are alternately disposed in a first direction which is an inclining direction of the splitting reflecting surfaces and in a second direction which is along the splitting reflecting surfaces and orthogonal to the first direction.

2. The optical receptacle according to claim 1, wherein
the light separating section further has splitting stepped surfaces each of which connect the splitting transmissive surfaces and the splitting reflecting surface in the inclining direction of the splitting reflecting surfaces,
the splitting stepped surfaces are parallel surfaces with respect to the optical axis of the light reflected at the reflecting surface, and
the splitting reflecting surfaces is alternated with the splitting transmissive surfaces and the splitting stepped surfaces in the first direction and in the second direction so as to form a matrix shape.

3. An optical module comprising;
an optoelectric converting device having a light emitting element and a light receiving element for monitoring light emitted from the light emitting element disposed on a substrate; and
the optical receptacle according to claim 2.

4. The optical module according to claim 3, wherein
the optoelectric converting device has a plurality of the light emitting elements disposed in line, and a plurality of the light receiving elements disposed in line so as to be parallel to the line of the light emitting elements, and
the optical receptacle has a plurality of the first optical surfaces disposed in line so as to correspond to the line of the light emitting elements, a plurality of the second optical surfaces disposed in line so as to correspond to the line of the light receiving elements, and a plurality of the third optical surfaces disposed in line.

5. The optical receptacle according to claim 1, comprising a plurality of the first optical surfaces disposed in line, a plurality of the second optical surfaces disposed in line, and a plurality of the third optical surfaces disposed in line.

6. An optical module comprising;
an optoelectric converting device having a light emitting element and a light receiving element for monitoring light emitted from the light emitting element disposed on a substrate; and
the optical receptacle according to claim 5.

7. The optical module according to claim 6, wherein
the optoelectric converting device has a plurality of the light emitting elements disposed in line, and a plurality of the light receiving elements disposed in line so as to be parallel to the line of the light emitting elements, and
the optical receptacle has a plurality of the first optical surfaces disposed in line so as to correspond to the line of the light emitting elements, a plurality of the second optical surfaces disposed in line so as to correspond to the line of the light receiving elements, and a plurality of the third optical surfaces disposed in line.

8. An optical module comprising:
an optoelectric converting device having a light emitting element and a light receiving element for monitoring light emitted from the light emitting element disposed on a substrate; and
the optical receptacle according to claim 1.

9. The optical module according to claim 8, wherein
the optoelectric converting device has a plurality of the light emitting elements disposed in line and a plurality of the light receiving elements disposed in line so as to be parallel to the line of the light emitting elements, and
the optical receptacle has a plurality of the first optical surfaces disposed in line so as to correspond to the line of the light emitting elements, a plurality of the second optical surfaces disposed in line so as to correspond to the line of the light receiving elements, and a plurality of the third optical surfaces disposed in line.

\* \* \* \* \*